(No Model.)
E. HUBER.
CAR COUPLING.
No. 376,093. Patented Jan. 10, 1888.
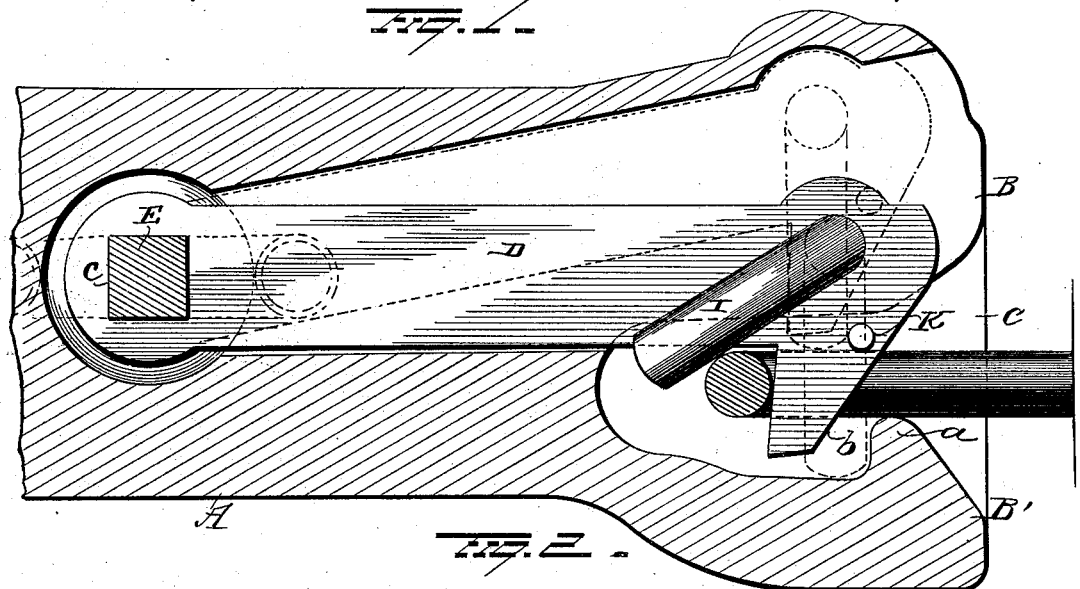
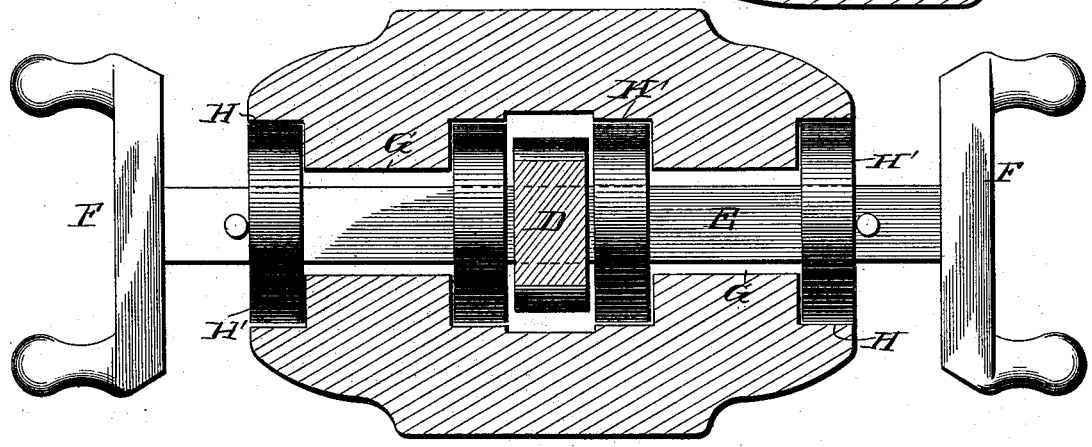
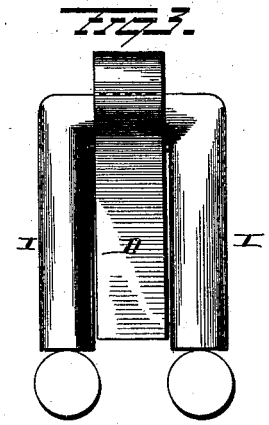
Witnesses
E. J. Nottingham
Geo. F. Downing
Inventor
Edward Huber.
By his Attorney
Leggett & Leggett
atty.

UNITED STATES PATENT OFFICE.

EDWARD HUBER, OF MARION, OHIO.

CAR-COUPLING.

SPECIFICATION forming part of Letters Patent No. 376,093, dated January 10, 1888

Application filed October 18, 1887. Serial No. 252,719. (No model.)

*To all whom it may concern:*

Be it known that I, EDWARD HUBER, of Marion, in the county of Marion and State of Ohio, have invented certain new and useful Improvements in Car-Couplings; and I do hereby declare the following to be a full, clear, and exact description of the invention, such as will enable others skilled in the art to which it appertains to make and use the same.

My invention relates to an improvement in car-couplers.

The object is to combine simplicity of parts, economy of material, and strength and co-operation of mechanism, and at the same time provide a coupler which may be manipulated without incurring any loss of time or danger to the operator.

With this end in view my invention consists in certain features of construction and combination of parts, as will be hereinafter fully described, and pointed out in the claims.

In the accompanying drawings, Figure 1 is a side elevation of a draw-head, a portion being broken away to show the coupling-hook, and dotted lines indicating an elevated position of the coupling-hook. Fig. 2 is a front elevation, partly in section, of the draw-head; and Fig. 3 is a front elevation of the coupling-hook and gravity-drop in its position after releasing the link.

A represents a draw-head having the ordinary spring-cushion, if desired, and preferably constructed, substantially as shown, with a pair of irregular-formed jaws, B B', with a mouth, C, between them. The upper jaw, B, is preferably larger than the lower one, B', and has a recess therein adapted to receive the coupling-hook, and the lower jaw is provided at its upper outer end with a nose, *a*. The whole draw-head is composed of refractory metal, as is customary, to withstand the jars and punishment to which draw-heads are always more or less subjected.

A drop-hook, D, consisting of a bar, D, and having an inclining hooked forward or free end, *b*, is, instead of being pivoted, as is usual for similar hooks, provided with an angular opening, *c*, at one end and mounted on a correspondingly-shaped rod, E. This rod is provided with handles F on each end, extending out a sufficient distance to be easily accessible to the operator, and it extends transversely through an enlarged opening, G, formed transversely in the draw-head. Circular sockets or recesses H are also formed in this head, preferably one on each side of the hook and one in each side of the draw-head. Circular bearing-collars H' are seated in these recesses, and as they are provided with an opening to receive the angular rod E they are designed to form bearings for the latter, which it would otherwise lack, because of its shape; but with these bearings when turned the collars turn freely in their sockets.

As previously hinted at, the coupling-hook is provided with an inclining forward edge or face. The function of this is apparent, as when the hook is depressed, or in normal position, it closes the mouth of the draw-head. Now, by virtue of the inclination of this face, a link entering the mouth automatically forces the coupling-hook up until it has passed under its hooked end, when the hook immediately drops down into the link and holds it; but to facilitate and expedite the uncoupling of cars a gravity-drop, I, preferably double, is pivoted to the head of the coupling-hook, with its members depending on either side of the coupling-link. Stops K are secured in the hook to prevent the drop from vibrating or being pulled outward. The double gravity-drop is of such a width that its members rest on the link when the hook is elevated.

In operation the drop normally rests on the lower jaw of the draw-head, holding the hook slightly elevated. A link now entering the mouth elevates the hook and pushes the drop back and up in the position shown in dotted lines in Fig. 1. The hook then drops and the coupling is effected. In uncoupling, the handles are turned. The hook is thereby elevated and the drop assumes the position shown in Fig. 3, resting on the link. The cars are now in adjustment to pull apart. Thus time is saved, as the operator has simply to give one of the handles F a turn and the link is in effect released or uncoupled.

It is evident that slight changes might be made in the form and arrangement of the several parts described without departing from the spirit and scope of my invention; hence I do not wish to limit myself to the particular construction herein set forth; but, Having fully described my invention, what

I claim as new, and desire to secure by Letters Patent, is—

1. In a car-coupler, the combination, with a draw-head and a coupling-hook therein, of a gravity-drop pivoted to said hook and adapted while uncoupling to hold the hook away from the link for the purpose of permitting withdrawal of the link.

2. In a car-coupler, the combination, with a draw-head, and a bar located transversly therein, said bar having circular collars whereby bearings are formed for the bar, of a coupling-hook mounted on the rod and a gravity-drop pivoted in the head of the hook, substantially as set forth.

3. In a coupling, the combination, with a draw-head formed substantially as shown, an angular bar located transversely in the draw-head, and a set of circular collars adapted to turn in sockets in the draw-head and furnish bearings for the bar, of a coupling-hook mounted on the said bar, a double gravity-drop pivoted in the head of the coupling-hook, and stops for limiting the vibration of the drop, all for the purpose substantially as set forth.

In testimony whereof I have signed this specification in the presence of two subscribing witnesses.

EDWARD HUBER.

Witnesses:
   J. E. DAVIDS,
   IRA UHLER.